Patented Feb. 27, 1951

2,543,406

UNITED STATES PATENT OFFICE 2,543,406

PROCESS FOR RECOVERY OF AN ALKALINE EARTH METAL IN ADMIXTURE WITH AN ALKALI METAL

Eugene F. Hill, Detroit, Mich., assignor to Ethyl Corporation, New York, N. Y., a corporation of Delaware No Drawing. Application April 1, 1949, Serial No. 85,051

9 Claims. (Cl. 75—97)

This invention relates to a process for the recovery of alkaline earth metals from mixtures containing such metals and alkali metals. The invention also relates to a process of making alkali metal alcoholates from said mixtures. More particularly my invention is directed toward the recovery of the calcium contained in sludges formed in electrolytic processes for the manufacture of sodium from a mixture of sodium and calcium chlorides.

In the production of sodium by electrolysis of fused sodium chloride, calcium chloride is added to the electrolyte in order to lower its melting point. During the electrolysis calcium metal, as well as sodium, is produced at the cathode, and at the temperature of operation dissolves in the sodium melt. When this solution is removed from the cell it is cooled and most of the calcium crystallizes out. This crude sodium mixture containing the calcium metal is purified, usually by mechanical separation, and most of the sodium recovered therefrom. The residue or sludge obtained from such separation consists of a mixture of solids containing crystals of calcium embedded in a matrix of sodium and it also contains impurities such as sodium and calcium oxides and chlorides. The total amount of metals in the residue varies but in general it is from 90 to 95 per cent. The amount of calcium contained therein is generally between 15 and 30 per cent.

Certain workers in this field have attempted to recover some of the sodium component from this sludge. However, this is impractical and commercial practice has been to dispose of this sludge by any safe means. One such means is to return the sludge to the electrolytic cells, but this procedure is uneconomical and hazardous. Also such residues can be disposed of by burning or by chemical means. These methods however, destroy the metal components since the resulting mixture of oxides and salts has no commercial value and must be wasted. None of the disposal methods are economical and all are hazardous due to the danger of fire and explosion if the sludge is contacted with water. Processes that have recovered sodium have not paid for the cost of the processing and were used primarily as a preferred means of disposal. The calcium values as well as the sodium values contained in such sludges are important. Heretofore there has been no process for recovering the calcium values substantially free of alkali metal.

Therefore it is an object of this invention to provide a process for economically recovering an alkaline earth metal from admixture with an alkali metal. A more specific object is to recover calcium substantially free of sodium metal from a sludge material containing sodium and calcium. Another object of my invention is to obtain a new calcium metal product in such finely divided form that it is especially suitable for use in commercial processes such as metal reduction, polymerizations, and for the production of calcium hydride. A further object is to recover sodium from such a mixture in the form of sodium alcoholate which is a valuable commercial product.

I accomplish these objects by treating a mixture of an alkaline earth metal and an alkali metal with an organic solvent which reacts with the alkali metal and dissolves the reaction product, following which I separate the undissolved alkaline earth metal from the resulting solution before it has had an opportunity to react therewith in noticeable amounts.

In general there are two types of organic solvents reactive with an alkali metal which can be used in my process. One type forms addition products with the alkali metal and the other forms substitution products therewith. Examples of organic solvents forming addition products are naphthalene, diphenyl, and anthracene. The organic solvents reactive with an alkali metal by substitution are those compounds having a hydrogen atom replaceable by an alkali metal. Compounds of this type include hydroxy hydrocarbons, certain amines such as methyl amine and ethylene diamine, weak organic acids such as aryl sulphonic acids and lauric acid, acetylene, and mercaptans such as thiophenol.

In general the organic solvents employed in my invention are those which react more rapidly with an alkali metal than with an alkaline earth metal, thus permitting separation of the alkaline earth metal from the system before it is consumed. As mentioned above, the organic solvent should form a reaction product with the alkali metal and should dissolve this product in order for high recoveries of a relatively pure alkaline earth metal to be obtained.

For the above reasons I prefer to use as my organic solvent hydroxy hydrocarbons, particularly monohydroxy hydrocarbons. Also the use of alcohols is preferred since the sodium alcoholates so formed can be readily recovered by removing excess alcohol. Such alcoholates are of considerable commercial value. Within the term monohydroxy hydrocarbons, I include alkyl, aryl, aralkyl, alkylene and cyclic alcohols having only one hydroxy group. Polyhydroxy hydrocarbons such as glycol and glycerine generally do not give as good results as the above monohydroxy hydrocarbons. When dihydroxy hydrocarbons are used such as glycol, relatively low temperature should be employed for best results. As examples of monohydroxy hydrocarbons, methyl, ethyl, propyl, isopropyl, butyl and allyl alcohol as well as phenol and cresol have been successfully employed in my process.

My process is applicable to the separation of alkaline earth metals from different mixtures in which they occur with alkali metals. For example I have separated successfully by my process mixtures of sodium-calcium, sodium-magnesium, and potassium-barium. Other mixtures of alkali and alkaline earth metals can also be separated by my process. Referring specifically to the sodium-calcium sludge mixture, a new form of highly reactive calcium of purity between 80 to 95 per cent and higher has been recovered in amounts of 80 to 90% of the calcium contained in the sludge.

In general the calcium produced in my process, especially that obtained from sodium-calcium sludge, is in the form of flat platelets, the major diameter of which varies from approximately 1/8 of an inch to 1/300 of an inch or less. My calcium product predominates in such a form and in such a particle size range. That is, more than 80% of my calcium has this form and size.

The calcium available on the market is in the form of lumps or turnings, and in this form is not entirely suitable for direct use in such processes as metal reduction and polymerization. Consequently such calcium must be further treated by grinding and chipping or other similar treatment to produce a usable but somewhat unsatisfactory particle size. Such operation are hazardous and expensive and therefore are of little commercial interest. However the calcium produced by my process is obtained in a state of subdivision which is ideal for direct use in the above-mentioned processes. Further, it can be readily converted by treatment with hydrogen to form calcium hydride which can be used directly in metal reduction processes and as a drying agent, without further grinding.

The proportion of particle sizes within the above range can be varied in my process to suit particular needs by changing the rate of cooling of the solution of alkaline earth metal in alkali metal after it is removed from the cell. That is, by slower cooling I can obtain a product which predominates in larger size particles or by more rapid cooling a preponderance of smaller particles may be obtained.

The temperature employed in my process, while not critical, is important. The operating temperature is varied according to the organic solvent employed and the residence time of the alkaline earth metal in the reaction medium. In general the temperature should not be higher than the boiling point of the reaction mixture. Preferably, temperatures considerably lower than this are employed when high purity of the calcium recovered is desired. For example when a calcium-sodium mixture is treated with methyl alcohol at temperatures below $-10°$ C., a high recovery of high purity calcium is obtained. When the same mixture is treated with ethyl or propyl alcohol somewhat higher temperatures of the order of $-10°$ C. to $+10°$ C. are preferably used. In general, when alcohols are used as the reaction medium the temperature should be maintained below $100°$ C. In all cases the pressure at the temperature used should be such as to maintain the organic solvent in the liquid phase in order that the alkali metal derivative thereof will be soluble therein.

The residence time of the alkaline earth metal in the reaction mixture is important. By residence time I mean the total time of contact of the alkaline earth metal with the reaction mixture. Alkaline earth metals such as calcium are generally reactive with the organic solvents employed herein, but at a much slower rate than the alkali metal. This rate frequently does not become appreciable until after the reaction between the alkali metal and the organic solvent has been completed. Thus according to my invention, the residence time is terminated after the time of the reaction of the alkali metal is completed, and before noticeable amounts of alkaline earth metals have been reacted.

The organic solvent employed also affects the average reaction rates of the metals being separated. For example, the relative reaction rates of sodium and calcium in admixture vary with the molecular weight of the alcohol used. The higher the molecular weight of the alcohol the less active the calcium becomes relative to the sodium. Thus ethyl alcohol is preferred over methyl alcohol because of the low degree of activity of calcium in ethyl alcohol as compared to sodium. In the same manner, the lower the temperature the greater the difference between the reaction rates of the alkali metal and the alkaline earth metal which results is a higher recovery of the latter. Even under condition in which the difference in the relative reaction rates is small, high recoveries of calcium are obtained if the calcium is removed from the system almost as rapidly as it is released.

When an alkaline-earth metal in a mixture containing an alkali metal is first contacted with an organic solvent such as ethyl alcohol substantially no reaction of the alkaline earth metal occurs for a period of time. This time I call the induction period for the alkaline earth metal. The induction period varied with the temperature employed, the organic solvent used, the type and proportion of metals contained in the mixture, the impurities contained in the mixture, and the ratio of the organic solvent to the metallic mixture. For any given set of variables including temperature, the induction period can be readily determined by a simple laboratory procedure as follows:

A sample of a mixture of metals such as a sodium-calcium mixture is added gradually to a reaction vessel, preferably glass, containing the organic solvent and equipped with suitable temperature control and measuring means. As the metallic mixture reacts hydrogen bubbles are evolved by reaction of the sodium with the organic solvent followed by a quiescent period during which the calcium falls to the bottom of the flask where it builds up in a layer. After a time, however, hydrogen bubbles start to appear above this layer of calcium, and it is vigorously stirred by this evolution of gas. The elapsed time required for the start of this vigorous evolution of hydrogen bubbles from the resulting layer of calcium on the bottom of the vessel is called the induction period. In this test, since initially the only source of hydrogen bubbles is the sample of sodium-calcium it is to be noted that the bubbles all arise from the vicinity of the sample due to reaction of the sodium. When the induction period of the calcium is ended, the liberated calcium starts to react, a froth of bubbles covers the entire surface of the reaction medium, and the calcium no longer rests quietly on the bottom of the vessel but is dispersed throughout the reaction medium by the vigor of the gas evolution.

For example, the induction period for calcium in a sodium-calcium sludge was tested as above in a reaction medium of ethyl alcohol which had been dried over calcium hydride and subsequently distilled into a dry flask. The temperature was maintained at −10° C. and the induction period of the calcium was observed as over 175 minutes. Similarly at temperatures of 10° C. and 45° C. the induction period for calcium in a dried ethyl alcohol medium was 41 and 8 minutes respectively. In like manner the induction period of calcium in a sodium-calcium sludge in methyl alcohol at −10° C., in propyl alcohol at 45° C., and in cresol at 45° C. was 16, 53, and over 175 minutes respectively.

Thus for any given temperature and reaction medium the induction period for the alkaline earth metal can be determined and the maximum residence time can be controlled so that the induction period of the alkaline earth metal is not exceeded. If the alkaline earth metal is removed from the reaction mass within the induction period good recoveries are obtained.

For example the induction period for calcium in a sodium-calcium sludge when treated with anhydrous ethyl alcohol at 10° C. is 41 minutes. When such sludge was processed using anhydrous ethyl alcohol at 10° C. with varying residence times of 34, 39 and 72 minutes, calcium was recovered in amounts of 75, 82 and 42% respectively based on the calcium in the mixture. When the residence time is increased over the induction period the yields are decreased until little if any calcium is recovered. For example, in the above type of test, when the residence time was about 6½ hours at a temperature of about 14° C. no calcium was recovered.

The small amount of calcium which can be recovered when it has remained in contact with the solution for a period of time longer than its induction period tends to be unstable and may burn spontaneously. Such instability renders it dangerous to handle and otherwise unsuitable for commercial utilization. In other words an inferior calcium product is obtained. Thus I have shown the importance of residence time to the amount of recovery of the calcium. High yields of high purity calcium are obtained when the residence time is less than the induction period of the calcium but greater than the reaction time for the sodium.

One preferred mode of operation of my invention is best described in connection with separating calcium from a calcium-sodium sludge in an ethyl alcohol reaction medium. The induction period for the chosen conditions of operation is first determined by the method previously described. In performing the separation, the sludge should be added at such a rate and in such a state of subdivision that substantially all the sodium will react with the alcohol before the induction period of the calcium which was liberated from the first portion of sludge has elapsed. By operating in this fashion the calcium will not be contaminated by pieces of unreacted sludge. The ethyl alcohol is charged to a reaction vessel provided with means of temperature measurement and with means for agitation. Suitable temperature control means, such as immersing the vessel in a constant temperature bath, are provided. Agitation is commenced and a stream of inert gas such as nitrogen may be continuously passed over the surface of the reaction medium if desired. The calcium-sodium sludge is added slowly to the vessel while maintaining the desired temperature. The reaction mass is then removed from the freed calcium and the freed calcium is first washed with fresh quantities of ethyl alcohol, then with hexane and the hexane then removed by evaporation with an inert gas such as nitrogen.

Unless otherwise stated the parts given herein are by weight and the yield is the per cent recovery by weight of the alkaline earth metal in the mixture.

Following the above procedure, 10 parts of a mixture containing 64.5% sodium, 24.5% calcium, 2% sodium chloride and 9% sodium and calcium oxides was added gradually to a reaction vessel containing 200 parts of anhydrous ethyl alcohol. The vessel was immersed in a constant temperature bath and the temperature was maintained at −10° C. for a residence time of 90 minutes, the induction period being over 175 minutes. The reaction mass was then removed from the reaction vessel and the settled calcium removed by filtration. The calcium produced was washed several times with fresh quantities of ethyl alcohol, then with hexane and the hexane removed by evaporation with nitrogen. The calcium was analyzed and a yield of 82% having 83.4% purity was obtained.

In a similar operation except that a temperature of +10° C. was maintained for a residence time of 34 minutes, the induction period being 41 minutes, a 75% yield of calcium having a purity of 80% was obtained. However, when the residence time at that temperature was double the yield of calcium as well as the purity decreased sharply.

In another operation, in adding 10 parts of the metal mixture to 200 parts of methyl alcohol and maintaining the temperature at −10° C. for a residence time of 15 minutes, the induction period being 16 minutes, an 83% yield of calcium having a 65.5% purity was obtained. Similarly by the use of propyl, n-butyl and allyl alcohols at temperatures of 45° C., 45° C., and 25° C. respectively, and a residence time of 14, 1020 and 125 minutes respectively, calcium yields of 97.5, 82 and 81% respectively, having a purity of 85.3, 91 and 70% respectively, were obtained.

Likewise when mixed cresols was used as the organic solvent, and when a temperature of 45° C. for a residence time of 180 minutes was employed, an 87.2% yield of calcium having a purity of 84% was obtained. Similarly when 19.1 parts of the same metal mixture was added gradually to 150 parts of biphenyl dissolved in 200 parts of dimethyl Cellosolve and a temperature of 25° C. maintained for a residence time of 1260 minutes, an 87.2% yield of calcium having a purity of 89% was obtained.

In another test conducted as above when 14.6 parts of the same metal mixture was added slowly to 68 parts of naphthalene while the temperature was maintained at 25° C. for a residence time of 300 minutes, a 67% yield of calcium having a 99% purity was obtained. In this test, the calcium recovery procedure was modified to some extent. At the end of the residence period the reaction mass was removed from the vessel and neutralized with cresol. The solid residue was then recovered by decantation and finally washed. The product was then dried, weighed and analyzed.

In all of the above examples the calcium product obtained was in the form of platelets, 80% of which had a major diameter in the size range of ⅛ inch to 1/300 inch. Also substantially all of the sodium was recovered as sodium alcoholate, or as sodium cresolate when cresol was used as a neutralizing medium in the biphenyl and naphthalene reactions.

In another operation 10 parts of a metallic mixture containing 83.9% potassium and 16.1% barium was added slowly to 200 parts of n-butyl alcohol. The temperature of reaction was maintained at −20° C. for a residence time of 161 minutes. In this test a barium yield of about 90% and a purity of about 80% was obtained.

Similarly, 10 parts of a metallic mixture containing 79% sodium and 21% magnesium was added to 160 parts of methyl alcohol. The reaction temperature was maintained at +10° C. for a residence time of 147 minutes. In this test a magnesium yield of about 90% and a product purity of about 80% was obtained.

In another embodiment of my invention the calcium-sodium mixture is introduced into a reaction vessel equipped as before and the temperature maintained relatively high in order to convert rapidly the sodium to the alcoholate and to release the calcium. However at the higher temperatures removal of the calcium before it has reacted might be difficult in view of the shortness of the induction period. Therefore as soon as the calcium is released, the reaction mass is rapidly cooled to a temperature at which the induction period is relatively long. This procedure allows ample time for removal of the calcium before it reacts to any extent with the alcohol reaction medium and high yields of calcium are thereby obtained.

Other modifications of my invention can be made. The above examples and modes of operation are not intended to limit my invention but are given to illustrate its nature.

I claim:

1. A process of recovering an alkaline earth metal from admixture with an alkali metal which comprises treating said mixture with an excess of a liquid organic solvent which reacts with both the alkali metal and alkaline earth metal but first preferentially reacts with substantially all the alkali metal and dissolves the reaction product during which reaction hydrogen bubbles are evolved; continuing the treatment until the reaction enters a quiescent stage during which the alkaline earth metal settles to the bottom of the reaction mixture; and separating the settled metal from the reaction mixture before any appreciable amount of hydrogen bubbles again begins to be evolved.

2. A process of recovering calcium from finely divided electrolytic sludges in which it occurs in admixture with sodium which comprises treating said sludge at a substantially constant temperature with a liquid monohydroxy hydrocarbon which preferentially reacts with substantially all the sodium and dissolves the reaction product during which reaction hydrogen bubbles are evolved; continuing the treatment until the reaction enters a quiescent stage during which the calcium settles to the bottom of the reaction mixture; and separating the settled calcium from the reaction mixture before any appreciable amount of hydrogen bubbles again begins to be evolved.

3. A process of recovering an alkaline earth metal from admixture with an alkali metal, which process comprises the steps of treating said mixture in finely divided form and at a substantially constant temperature with an excess of a liquid organic solvent which reacts with both the alkali metal and alkaline earth metal but first preferentially reacts with the alkali metal and dissolves the reaction product, during which reaction hydrogen bubbles are evolved; continuing the treatment until the reaction enters a quiescent stage during which the alkaline earth metal settles to the bottom of the reaction mixture; then rapidly cooling the reaction mixture to slow down further action; and separating the settled metal from the cooled reaction mixture before any appreciable amount of hydrogen bubbles again begins to be evolved.

4. The process as defined by claim 1 in which the organic solvent is a monohydroxy hydrocarbon.

5. The process as defined by claim 1 in which the organic solvent is naphthalene.

6. The process as defined by claim 1 in which the organic solvent is ethyl alcohol.

7. The process as defined by claim 1 in which the organic solvent is butyl alcohol.

8. The process as defined by claim 1 in which the organic solvent is isopropyl alcohol.

9. The process as defined by claim 1 in which the organic solvent is phenol.

EUGENE F. HILL.

REFERENCES CITED

The following references are of record in the file of this patent:

UNITED STATES PATENTS

| Number | Name | Date |
|---|---|---|
| 2,215,507 | Hunlock | Sept. 24, 1940 |
| 2,294,895 | Drapeau | Sept. 8, 1942 |
| 2,359,401 | Wulff | Oct. 3, 1944 |
| 2,408,931 | Heath et al. | Oct. 8, 1946 |

OTHER REFERENCES

"Handbook of Chemistry and Physics," 28th ed., published by the Chemical Rubber Publishing Co., 1944, pages 358, 359, 454, and 455.

"Handbook of Nonferrous Metallurgy" by Liddell, second ed., vol. 2, published by McGraw-Hill Book Co., Inc., 1945, page 87.